Feb. 10, 1959 J. W. BREM 2,872,709
CONTINUOUS SERVICING PLANT FOR AUTOMOBILES OR THE LIKE
Filed Aug. 25, 1953 5 Sheets-Sheet 2
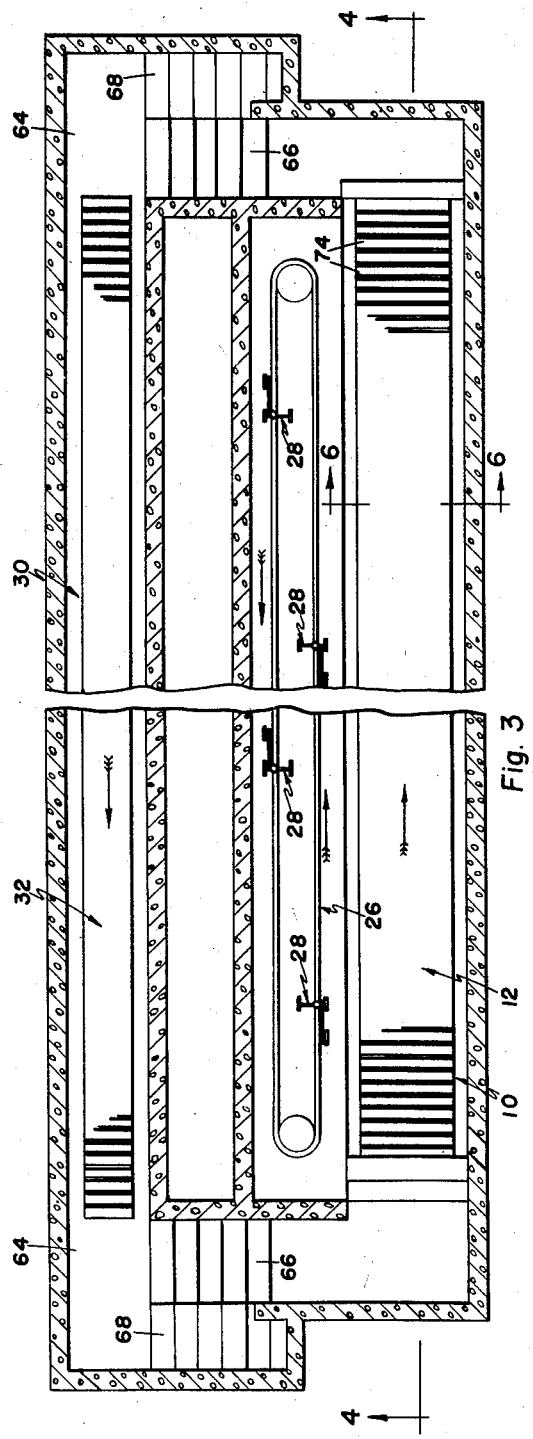
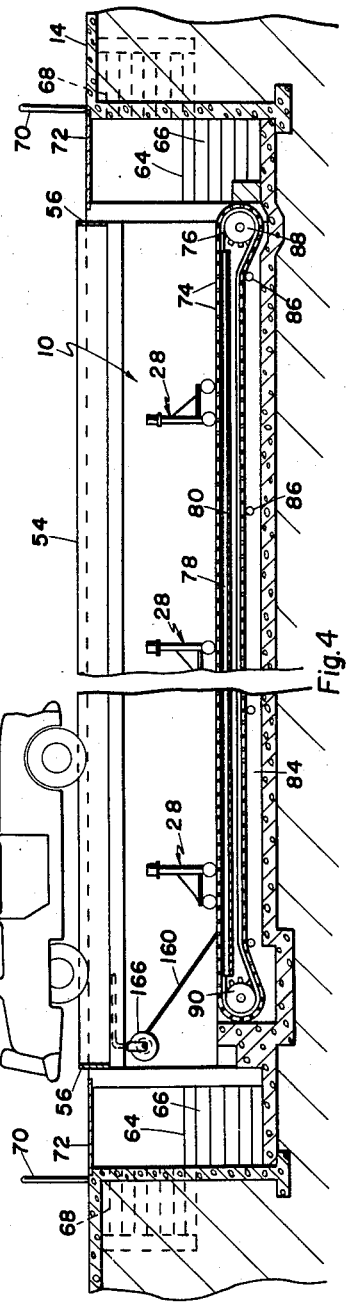
INVENTOR.
JACK W. BREM
BY Knox & Knox
AGENTS FOR APPLICANT Feb. 10, 1959                J. W. BREM                2,872,709
           CONTINUOUS SERVICING PLANT FOR AUTOMOBILES OR THE LIKE
Filed Aug. 25, 1953                                 5 Sheets-Sheet 3

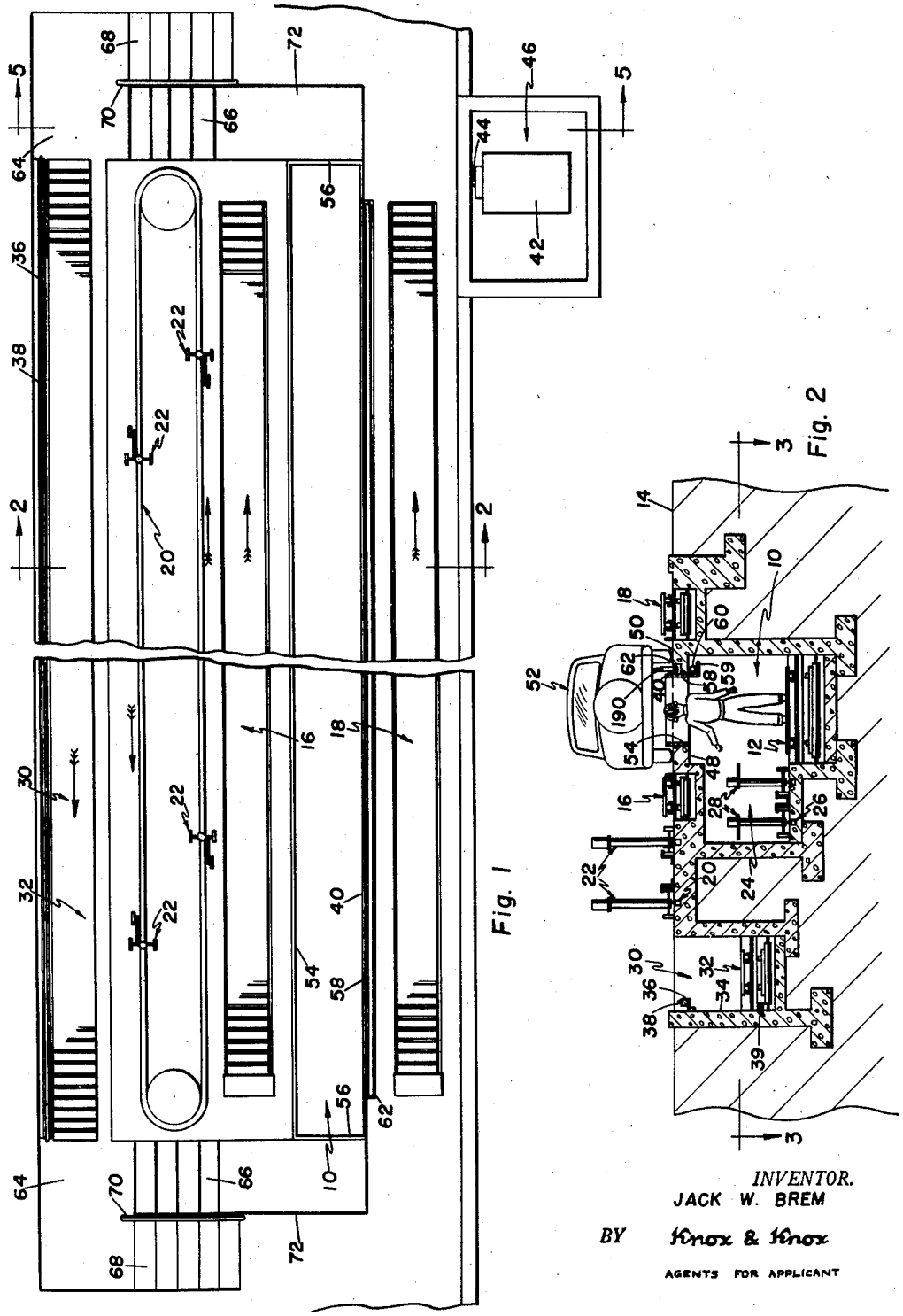

INVENTOR.
JACK W. BREM
BY Knox & Knox
AGENTS FOR APPLICANT

Feb. 10, 1959 J. W. BREM 2,872,709
CONTINUOUS SERVICING PLANT FOR AUTOMOBILES OR THE LIKE
Filed Aug. 25, 1953 5 Sheets-Sheet 4
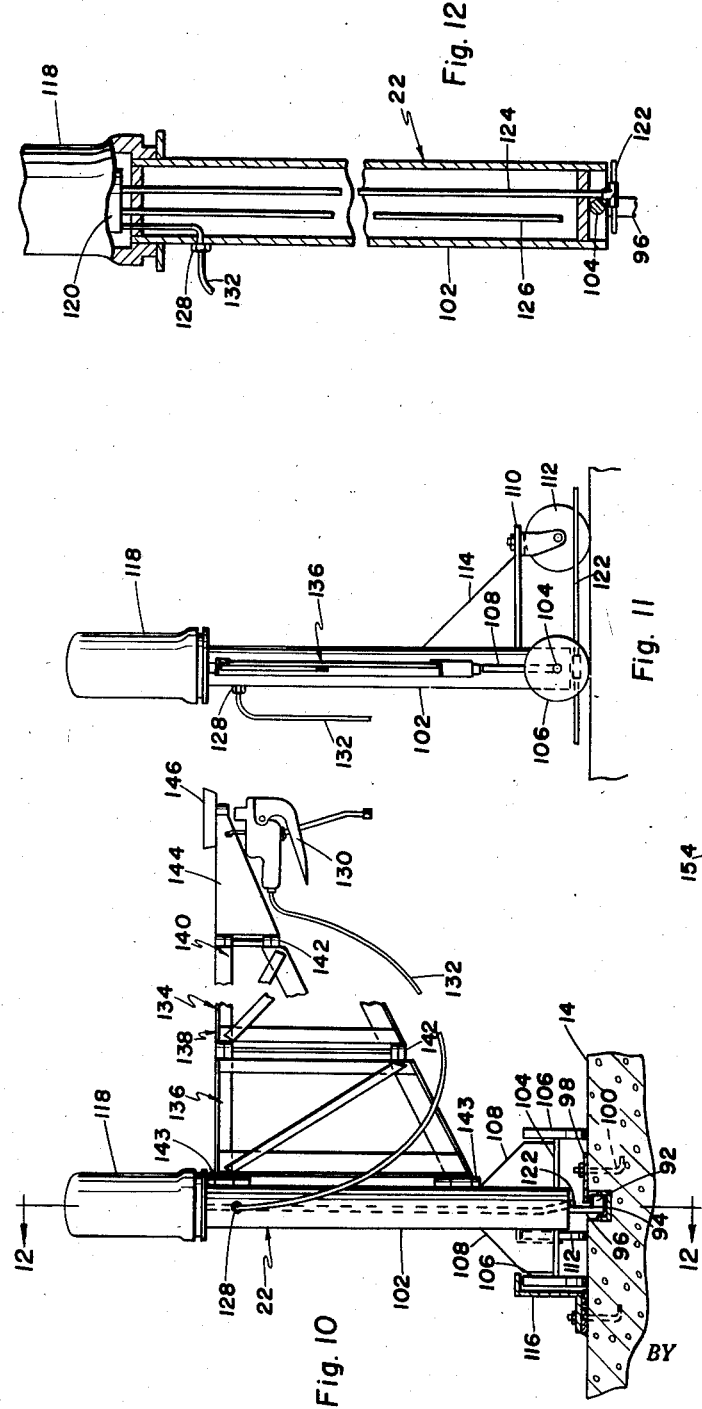
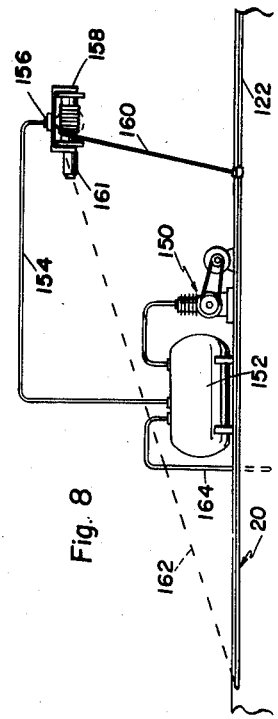
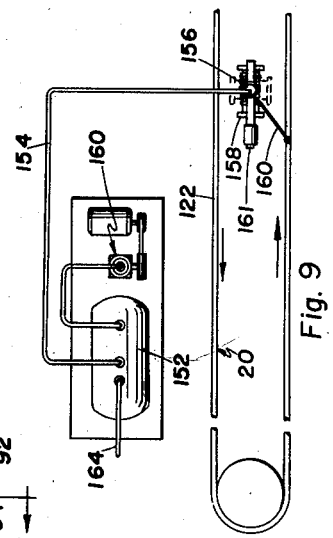
INVENTOR.
JACK W. BREM
BY Knox & Knox
AGENTS FOR APPLICANT Feb. 10, 1959 J. W. BREM 2,872,709
CONTINUOUS SERVICING PLANT FOR AUTOMOBILES OR THE LIKE
Filed Aug. 25, 1953 5 Sheets-Sheet 5
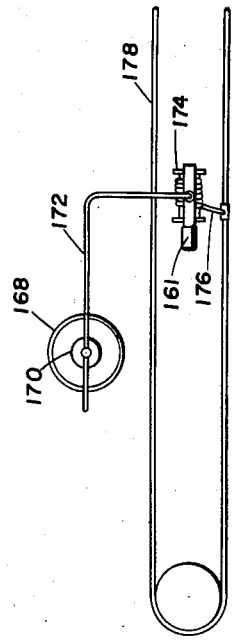
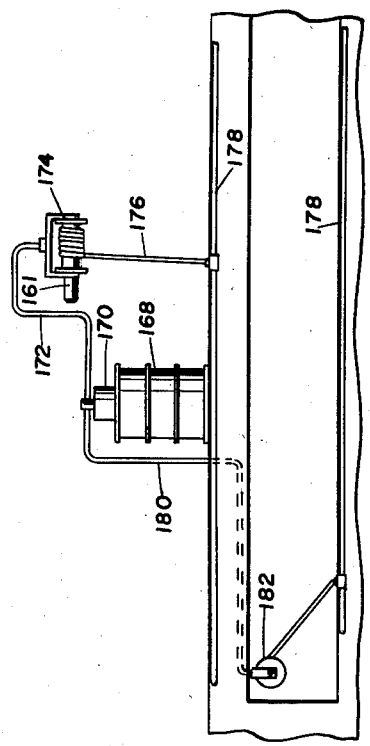
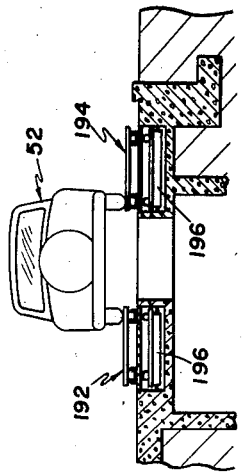
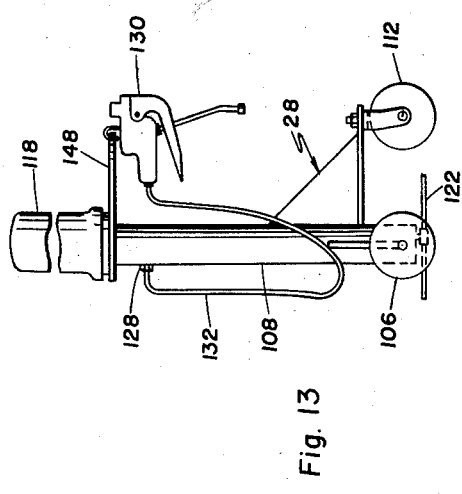
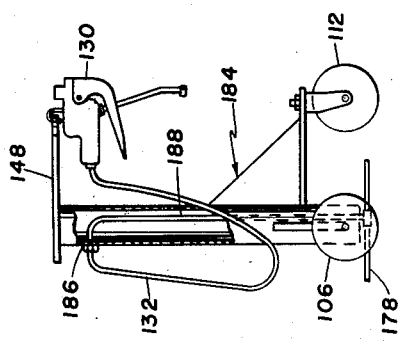
INVENTOR.
JACK W. BREM
BY Knox & Knox
AGENTS FOR APPLICANT

United States Patent Office 2,872,709
Patented Feb. 10, 1959

2,872,709

CONTINUOUS SERVICING PLANT FOR AUTOMOBILES OR THE LIKE

Jack W. Brem, San Diego, Calif.

Application August 25, 1953, Serial No. 376,315

1 Claim. (Cl. 20—.8)

The present invention relates generally to automotive vehicle servicing and more particularly to a continuous, fast service plant having particular reference to oil changing, chassis lubrication and like operations.

The primary object of this invention is to provide a servicing plant in which constantly moving automobiles may be lubricated and generally serviced, the installation including conveyors on which the operators are advanced along with the vehicles.

Another object of this invention is to provide a servicing plant in which supply carts carrying the necessary tools and equipment are advanced with the operators.

Another object of this invention is to provide a servicing plant in which the vehicles are serviced from alongside and from below simultaneously.

Another object of this invention is to provide a servicing plant having a fast return conveyor to return the operators to the starting point.

Another object of this invention is to provide a servicing plant in which the various conveyors are driven from a single motor and thus are easily synchronized.

Another object of this invention is to provide a servicing plant in which the supply carts are self cantained or may be supplied with lubricant or the like from a central source.

Finally, it is an object to provide a servicing plant of the aforementioned character which is simple, safe and convenient to operate, and which will give generally efficient and durable service.

With these and other objects definitely in view, this invention consists in the novel construction, combination and arrangement of elements and portions as will be hereinafter fully described in the specification, particularly pointed out in the claims, and illustrated in the drawings which form a material part of this disclosure and wherein similar characters of referenced indicate similar or identical elements and portions throughout the specification and throughout the views of the drawings, and in which:

Fig. 1 is a plan view of the installation.

Fig. 2 is a sectional view taken on the line 2—2 of Fig. 1.

Fig. 3 is a sectional view taken on the line 3—3 of Fig. 2.

Fig. 4 is a sectional view taken on the line 4—4 of Fig. 3.

Fig. 8 is a diagrammatic side elevation view of the pressure distributing apparatus for the supply carts.

Fig. 9 is a plan view of the apparatus shown in Fig. 8.

Fig. 10 is an enlarged end elevation view of a single supply cart having a folding tool rack.

Fig. 11 is a side elevation view of the supply cart, the tool rack being partially omitted.

Fig. 12 is an enlarged sectional view taken on the line 12—12 of Fig. 10.

Fig. 13 is a side elevation view of a supply cart having a fixed tray in place of the folding tool rack.

Fig. 14 is a diagrammatic plan view of the lubricant distributing apparatus.

Fig. 15 is a diagrammatic side elevation view of the apparatus shown in Fig. 14.

Fig. 16 is a side elevation view, partially cut away, of a modified supply cart.

Fig. 17 is a fragmentary sectional view similar to Fig. 2, but showing an alternative method of transporting the vehicle.

Figure 7:
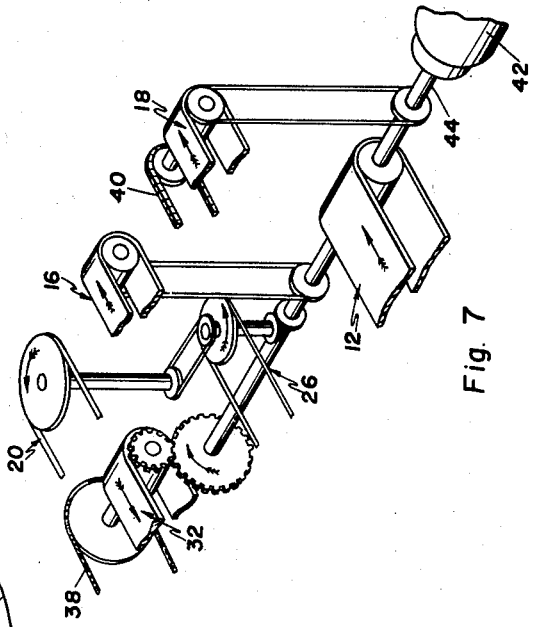
Fig. 7 is a diagrammatic view of the driving mechanism of the installation.
Figure 5:
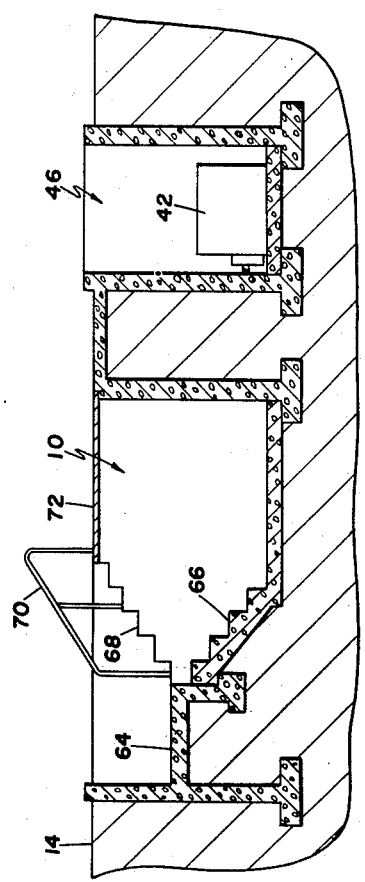
Fig. 5 is a sectional view taken on the line 5—5 of Fig. 1.

Referring now to the drawing, the servicing plant is constructed in the floor of a suitable building and includes a pit 10 in which is mounted the lower conveyor 12. At each side of the pit 10 on the level of the floor 14 are the upper conveyors 16 and 18, which move at the same speed and in the same direction as the lower conveyor 12. Alongside the upper conveyor 16 is the upper cart conveyor 20 which carries a plurality of supply carts 22. In the pit 10 is an alcove 24 in which is mounted the lower cart conveyor 26 carrying a plurality of supply carts 28.

Along the side of the installation remote from the pit 10 is a relatively shallow return pit 30 in which is installed the return conveyor 32. This return conveyor operates in the opposite direction to the other conveyors and at approximately three times their speed. On the wall 34 of the return pit 30 is a hand rail 36 along which slides an endless rope 38 which moves at the same speed as the return conveyor 32, said rope returning beneath the conveyor as indicated at 39.

Alongside the pit 10 adjacent the upper conveyor 18 is a tow chain 40 by which the vehicles are towed through the plant, the tow chain, of course, being synchronized with the upper conveyor.

All of the conveyors, the tow chain 40 and the endless rope 38 are driven by a motor 42 having a drive shaft 44, the general arrangement being shown diagrammatically in Fig. 7. The motor 42 is installed in a suitable motor pit 46 at one side of the plant. The pit and non-mechanical portions of the installation may be constructed of concrete or the like according to conventional building standards.

The pit 10 has overhangs 48 and 50 at the sides thereof to provide tracks for the vehicles to be serviced as represented by the automobile 52 shown in Figs. 2 and 4. The pit 10 is surrounded on three sides by guard plates 54 and 56, and on the remaining side by a guard plate 58. This latter guard plate 58 is flanged outwardly along its lower edge as indicated at 59 to conceal the returning portion 60 of the tow chain 40, the upper portion of which rides in a channel 62 in the overhang 50. The guard plates serve to prevent loose articles such as tools or the like from falling into the pit and also prevent the wheels of the vehicles from accidentally slipping into the pit.

At each end of the plant is a landing 64 on a level with the bottom of the return pit 30. From the landings 64 are steps 66 leading downwardly to the pit 10 and steps 68 leading upwardly to the floor 14, the upper steps having a protective rail 70. By means of these steps, workers from the pit 10 and from the floor 14 may reach the return conveyor 32 and travel back to their starting place. The pit 10 is enclosed at the ends by cover plates 72 which provide walkways from the upper conveyors 16 and 18 to the steps 68.

Figure 6:
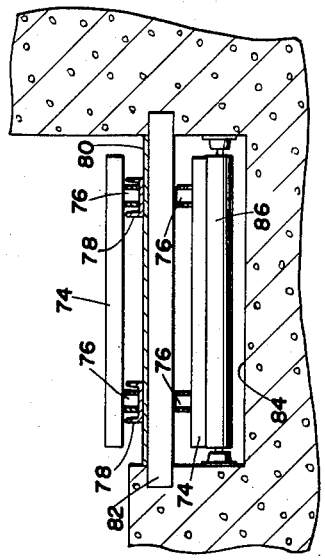
Fig. 6 is a sectional view taken on the line 6—6 of Fig. 3.

The lower conveyor 12 comprises a plurality of slats 74 individually secured to endless flexible chains 76. The chains ride in channels 78 which are attached to a support plate 80, said support plate resting on a suitable cross beam 82 built into the main concrete structure as shown in Fig. 6. Beneath the support plate 80 is a shallow trough 84 through which the conveyor returns, the conveyor being supported on rollers 86 secured to the sides of said trough. At the end of the pit, adjacent the motor 42, the chains 76 are passed around driving gears 88 and at the other end of the pit are guided by idler gears 90. The chains 76 are of conventional type such as those used in the conveyors of large dairies or the like, these chains being extremely flexible and having excellent wearing qualities.

The upper conveyors 16 and 18 and the return conveyor 32 are all constructed in a similar manner to the lower conveyor 12 described above, and thus need not be individually described.

The upper cart conveyor 20 comprises an endless flexible chain 92 similar to the chains 76, said chain riding in a channel 94 which is recessed in the floor 14. The supply carts 22 are fastened to the chain 92 at spaced intervals by means of connecting links 96. The chain 92 is held in the channel 94 by a retaining plate 98 which is fastened to the floor by hook bolts 100 or the like.

The supply carts 22 each comprise a tubular pillar 102 having at its lower end an axle 104 on which are the main wheels 106, said axle being braced by means of gussets 108 as shown in Fig. 10. Projecting from the pillar 102 at right angles to the axle 104 is a support arm 110 on which is mounted a castering wheel 112. The support arm 110 is braced by a gusset 114 as shown on the supply cart 28 in Fig. 11, both types of supply carts having an identical wheel arrangement. The main wheels 106 disposed toward the outside of the circuit are held under guide rails 116 which are secured to the floor and assist in supporting the supply carts.

At the top of the pillar 102 is a housing 118 containing a pump 120 of any suitable type for pumping grease, the pump shown being of the air driven type. Compressed air is supplied to the pump 120 through an endless air hose 122 interconnecting all of the supply cars 22 and following the general path of the chain 92. This air hose 122 is connected to each pump by an extension pipe 124, each pump also having an intake pipe 126 which extends to the lower end of the interior of the pillar 102. The pillar serves as a reservoir for the grease used in lubricating vehicles, the grease being pumped through the outlet 128 as required. A grease gun 130 is connected to each outlet 128 by means of a delivery hose 132.

The supply carts 22 are each provided with a folding arm 134 comprising a plurality of frames 136, 138 and 140 pivotally interconnected by means of hinges 142, the exact method of constructing the frames being relatively unimportant. The frame assembly is tapered in depth, the larger frame 136 being pivoted to the pillar 102 by hinges 143. At the smaller end of the frame 140 is pivoted a bracket 144 on which is fastened a tray 146 for holding various tools such as wrenches or the like, and for battery water, brake fluid or similar substances, said bracket also serving to carry the grease gun 130.

The supply carts 28 are basically similar to the supply carts 22 except that the folding arm 134 is omitted, the confined space in the pit eliminating the need for such an extension of the tool carrying tray. At the top of each of the supply carts 28 is a flat platform 148 which carries the grease gun 130 and other necessary tools, said platform extending substantially to one side of the cart.

Pressurized air for driving the pumps 120 is supplied to the air hose 122 from an air compressor 150 and air tank 152 installed at one side of the plant in a suitable position. A pipe 154 is carried from the air tank 152 to an overhead rotatable connection 156 from which is suspended a hose reel 158. This hose reel carries a hose 160, the arrangement being similar to that used in service stations where an air hose or the like is stored on such a reel readily available for use, and is automatically reeled in when released. The hose reel 158 may be biased by any suitable means such as the motor 161, which rotates continuously to reel in the hose and is connected to said hose reel through a friction clutch (not shown), so that the hose may be extended against the pull of the motor as the cart conveyors circulate. The hose 160 is connected to a convenient position on the air hose 122. Thus, as the air hose 122 follows the path of the cart conveyor, the hose 160 extends or retracts as required, the fully extended position being shown dotted at 162 in Fig. 8. A further pipe 164 leads from the air tank 152 and is carried beneath the floor to a hose reel 166 installed at one end of the alcove 24. This hose reel is similar to that described above and supplies air pressure to the lower cart conveyor.

As an alternative to the air operated pumps delivering grease from the reservoirs built into the supply carts, the grease may be carried to the carts directly under pressure. This arrangement is illustrated diagrammatically in Figs. 14 and 15 in which a grease tank 168, having thereon a pump 170, is installed at one side of the plant. A pipe 172 extends from the pump 170 to an overhead rotating hose reel 174 similar to that previously described, said hose reel carrying a hose 176 which is connected to the endless grease hose 178 supplying the upper cart conveyor. A further pipe 180 is extended from the pump 170 to a hose reel 182 supplying the lower cart track. It will be evident that the arrangement is similar to the air supplying apparatus illustrated in Figs. 8 and 9.

The supply cart 184 used with the latter pressurized grease distributing apparatus is shown in Fig. 16. This particular supply cart is substantially similar to the supply cart 28, except that the pump is omitted and the grease hose 178 is connected directly to the outlet 186 by means of an extension pipe 188.

It is obvious that the installation of the servicing plant includes suitable approach and exit ramps or the like so that vehicles may be guided into position. Each vehicle is driven to the starting point, which is at the left as shown in the drawings. The vehicle is then connected to the tow chain 40 by means of a tow link 190 such as that used in a conventional automobile washing installation. With its wheels straddling the pit 10 and riding on the overhangs 48 and 50, the vehicle is thus pulled along.

The operators who are to service the vehicle from the floor level then step onto the upper conveyors 16 and 18 and are carried alongside the vehicle as it progresses. The tools and equipment are transported on the supply carts 22. According to the length of the installation, a number of vehicles may be serviced simultaneously by separate crews of operators.

Beneath the vehicle, in the pit 10, further operators are transported on the lower conveyor, their equipment being carried on the supply carts 28. Thus the vehicle is simultaneously lubricated and checked from below, and serviced from above.

On reaching the end f the plant, the vehicle is disconnected from the tow chain 40 and removed for additional services such as wheel greasing or the like. The operators step from the upper and lower conveyors and move to the landing by way of the steps 66 and 68 respectively. From the landing, the operators then step onto the return conveyor 32 and are carried back to the starting point. Due to the relatively high speed of this return conveyor, the hand rail 36 and its moving rope 38 are provided for safety.

On reaching the starting point, the operators step from the return conveyor to the landing, and continue to their respective starting positions at the upper and lower conveyors in readiness for the next vehicle.

As an alternative to pulling the vehicle along by means of the tow chain 40, the vehicle may be carried on the upper conveyors as shown in Fig. 17. In this arrangement, the upper conveyors 192 and 194 are widened to enable the wheels of the automobile 52 to rest on the edges thereof. The return portions of these conveyors are supported on rollers 196 which are installed in a manner similar to that previously described. The entire structure is, of course, reinforced to carry the additional weight of the automobile.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

A servicing plant for automobiles or the like, including a rectangular elongated pit having therein an endless lower conveyor, endless upper conveyors at each side of said pit at the upper edges thereof, a lower cart conveyor in said pit at one side of said lower conveyor, an upper cart conveyor at one side of one of said upper conveyors, an endless tow chain mounted along one upper edge of said pit, a motor driving all of said conveyors, said cart conveyors and said tow chain in one direction at one speed, and a return conveyor at one side of the plant, said return conveyor being operatively connected to said motor to move in the opposite direction to and at a greater speed than the other conveyors said cart conveyors each including a plurality of carts, said carts each comprise a wheeled carriage having thereon a lubricant reservoir, an air-actuated pump mounted on said carriage, endless air hoses attached to said lower and upper cart conveyors, said air hoses communicating with each of said pumps, stationary air pressurizing means at one side of the plant, rotatable hose reels operatively connected to said pressurizing means, extensible hoses on said hose reels, said hoses being connected to said endless air hoses, whereby pressurized air is supplied to each of said pumps continuously, each pump being operatively connected to extract lubricant from the reservoir, and a lubricant dispensing gun communicating with said pump.

References Cited in the file of this patent

UNITED STATES PATENTS

| | | |
|---|---|---|
| 501,331 | Doolittle | July 11, 1893 |
| 1,722,818 | Mugler | July 30, 1929 |
| 1,787,763 | Rosebrook | Jan. 6, 1931 |
| 1,877,584 | Pulliam | Sept. 13, 1932 |
| 2,049,025 | Rosebrook | July 28, 1936 |
| 2,052,748 | Bowers | Sept. 1, 1936 |
| 2,696,921 | Desjardins | Dec. 14, 1954 |

FOREIGN PATENTS

| | | |
|---|---|---|
| 314,818 | Great Britain | Oct. 30, 1930 |
| 878,438 | Germany | June 25, 1953 |